United States Patent
Santana

(10) Patent No.: US 11,424,644 B2
(45) Date of Patent: Aug. 23, 2022

(54) APPARATUS AND METHOD FOR THE CONVERSION AND ENHANCEMENT OF COMMERCIALLY AVAILABLE WIRELESS ELECTRIC HAIR CLIPPERS

(71) Applicant: Daniel Santana, Tampa, FL (US)

(72) Inventor: Daniel Santana, Tampa, FL (US)

( * ) Notice: Subject to any disclaimer, the term of this patent is extended or adjusted under 35 U.S.C. 154(b) by 0 days.

(21) Appl. No.: 16/416,007

(22) Filed: May 17, 2019

(65) Prior Publication Data

US 2022/0140650 A1     May 5, 2022

(51) Int. Cl.
*H02J 50/00* (2016.01)
*H02J 50/10* (2016.01)
*B26B 19/38* (2006.01)

(52) U.S. Cl.
CPC ........ *H02J 50/005* (2020.01); *B26B 19/3873* (2013.01); *H02J 50/10* (2016.02)

(58) Field of Classification Search
CPC ........ H02J 50/005; H02J 50/10; H02J 7/0045; H02J 50/00; H02J 7/00; H02J 50/12; H02J 50/40; B26B 19/3873
USPC ..................................... 320/108
See application file for complete search history.

(56) References Cited

U.S. PATENT DOCUMENTS

| | | | |
|---|---|---|---|
| 5,054,199 A | 10/1991 | Ogawa | |
| 7,518,337 B2 | 4/2009 | Beart | |
| 2012/0022555 A1 | 1/2012 | Martinez | |
| 2012/0091950 A1 | 4/2012 | Campanella et al. | |
| 2015/0157112 A1 | 6/2015 | Daibes | |
| 2015/0314462 A1 | 11/2015 | Roman | |
| 2018/0041058 A1 | 2/2018 | Goldberg | |
| 2020/0360956 A1* | 11/2020 | Santana | A45D 40/26 |

* cited by examiner

*Primary Examiner* — Paul Dinh
(74) *Attorney, Agent, or Firm* — Boudwin Intellectual Property; Daniel Boudwin

(57) ABSTRACT

An adapter used on wireless electric hair clippers for enabling wireless charging, comprising a base part, wherein electricity converting means are housed; a power delivery means having conduits delivering the electrical charge to the batteries stored in the wireless electric hair clippers; a guard that meets the contour of the wireless electric hair clippers while protecting the body of the wireless electric hair clippers from induction wiring; and a housing for the induction wiring whereby the housing can be of a suitable shape to meet the power needs of the wireless electric hair clippers. The adapter can be tuned in size and shape to match any type of electric hair clippers. An adapter and clipper set can be formed for wireless charging. A method of recharging a commercially available wireless electric hair clipper, comprising obtain said commercially available wireless electric hair clipper, attach a wireless adapter to said commercially available wireless electric hair clipper, position said commercially available wireless electric hair clipper on a recharging mat; and recharge said commercially available wireless electric hair clipper. A method of transforming a commercially available wireless electric hair clipper into a wireless charging clipper comprising, obtain said commercially available wireless electric hair clipper and attach a wireless adapter to said commercially available wireless electric hair clipper.

20 Claims, 9 Drawing Sheets

APPARATUS AND METHOD FOR THE CONVERSION AND ENHANCEMENT OF COMMERCIALLY AVAILABLE WIRELESS ELECTRIC HAIR CLIPPERS

BACKGROUND

FIG. 1 is an embodiment of existing commercially available electric clippers 101, whereas 'clippers' refers to shavers, electric razors, hair trimmers and other devices used in the grooming of mammalian hair, while being powered by an internal power source, such as rechargeable batteries. Wireless clipper 101 generally provide electrically operated tools useful for the grooming of mammalian hair while being able to operate without the use of an attached power cord. Wireless clippers 101 have been generally powered by battery sources, such as rechargeable batteries and alkaline batteries. Such battery sources are generally stored within the body of the clippers 101. As exhibited in the prior art, rechargeable batteries used as the power source requiring a means for recharging them, which can include the use of a base 103. The base 103 is then connected to an AC power source 105 which is then inserted into an AC socket or power strip. In another embodiment, the wireless clipper 101 may attach directly to an AC power source 105 which is then inserted into an AC socket or power strip.

At issue, or problem, with the prior art wireless clippers is the requirement for the use of an AC power source 105. In professional hair care environments, such as barber shops and beauty salons, space is at a premium for hair care professionals because of the necessity to contain many hair care professionals within the work environment, as well as the multitude of tools and supplies every professional requires in order to perform a client's desired grooming needs. Whereas wireless clippers have removed clutter within the work environment, every wireless clipper that a professional utilizes, and usually they use from 3 to 5 different clippers, requires a separate AC power source. For example, if the professional uses 3 different clippers, they will require 3 different AC power sources. Thus, space is made even more unavailable to the professional. Multitude of AC power sources thus increase clutter, which is unsettling for clients and makes the work for the professional more difficult within which to work. The present invention has as a goal to provide a means for hair care professionals to consolidate the recharging capabilities of their wireless clippers into one unit, whereby all wireless clippers used by the professional are simultaneously chargeable by one central device.

The present invention also has a goal of allowing hair care professionals to obtain and convert and enhance any commercially available wireless hair clipper and make it wirelessly rechargeable by the present means.

The present invention also has as its goal allowing hair care professionals the ability to convert their existing wireless hair clippers to allow them to be rechargeable by wireless means irrespective of the brand, model, and make of the particular wireless hair clipper.

The present invention further has as a goal a money saving device by not requiring hair care providers to purchase specifically manufacturing wireless hair clippers in order to gain the ability to recharge the hair clippers wirelessly.

DETAILED DESCRIPTION OF DRAWINGS

DETAILED DESCRIPTION

Figure 1:
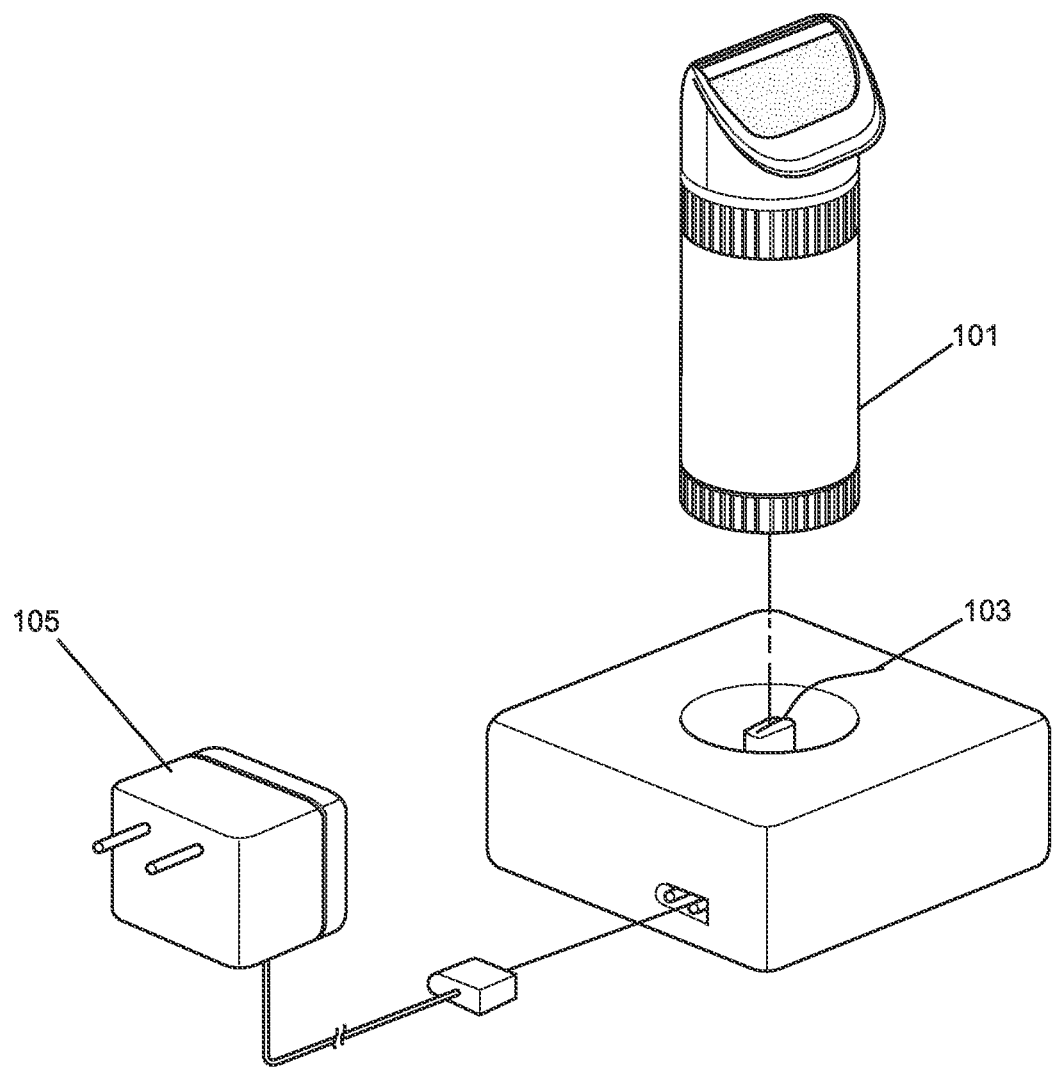
FIG. 1 is an embodiment of existing commercially available electric clippers.
Figure 2:
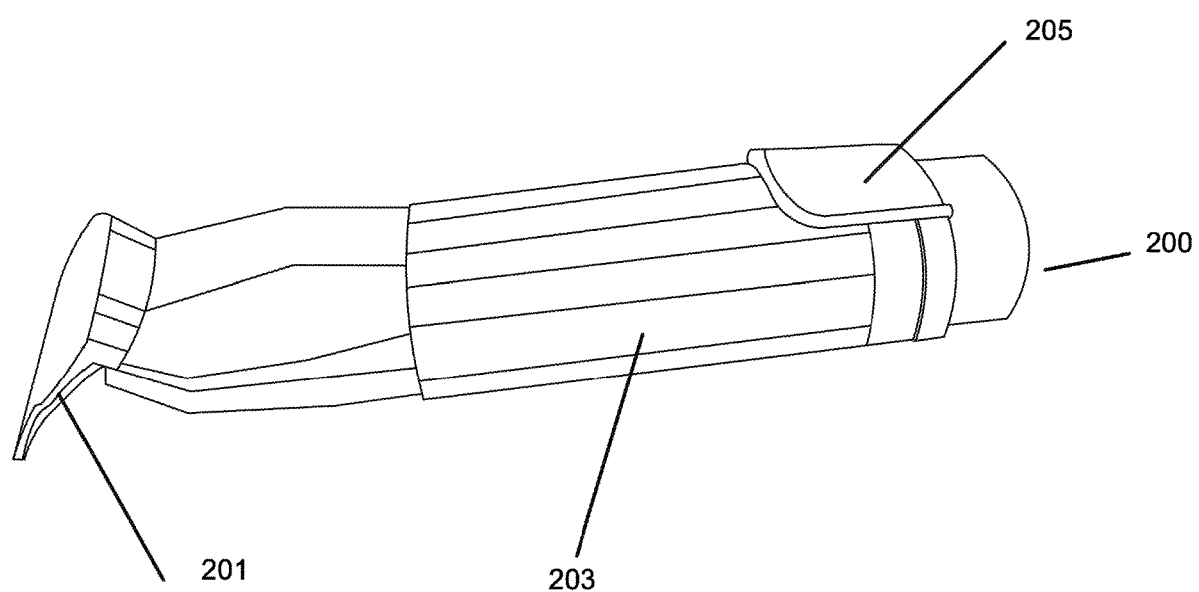
FIG. 2 is an embodiment of the present invention.

FIG. 2 of the present invention is an embodiment a wireless clipper 200 of the present invention that is capable of being charged wirelessly. The embodiment of FIG. 2 was a wireless clipper that required recharging through the use of an AC power source (see FIG. 1).

The wireless clipper 200 possesses a head 201 upon which generally sits a blade that operates in a known manner for such blades, i.e., either rotationally or vibrationally. The hair clipper 200 also possesses a body 203 wherein is housed the capability to turn electro-energy into mechanical energy that results in the means to groom hair. In such a wireless clipper 200, the body 203 also possesses rechargeable batteries that deliver the electro-energy. As stated, the wireless clipper 200 is an example of a commercially-available wireless hair clipper whereby recharging of the internal battery source occurs via an AC power source. 'Commercially-available' as used herein refers to products that may be purchased in the marketplace by laypersons and professionals. Commercially-available may refer to products currently being sold, or products that may be sold in the future. An example of brands of commercially-available hair clippers include Whal, Oster, Andis, Remington, Sminiker, Suprent, Woner, Liberex, and others. Most, if not all, brands possesses versions of wireless hair clippers.

The present invention converts or modifies, and enhances, the commercially-available wireless hair clippers through the addition of the adapter 205, whereby the wireless clippers which once required their own separate, and specific, AC power source for recharging now can be recharged through the use of one central device simultaneously. The adapter 205 is capable of this conversion for existing wireless hair clippers 200, as will be discussed in more detail.

Figure 3:
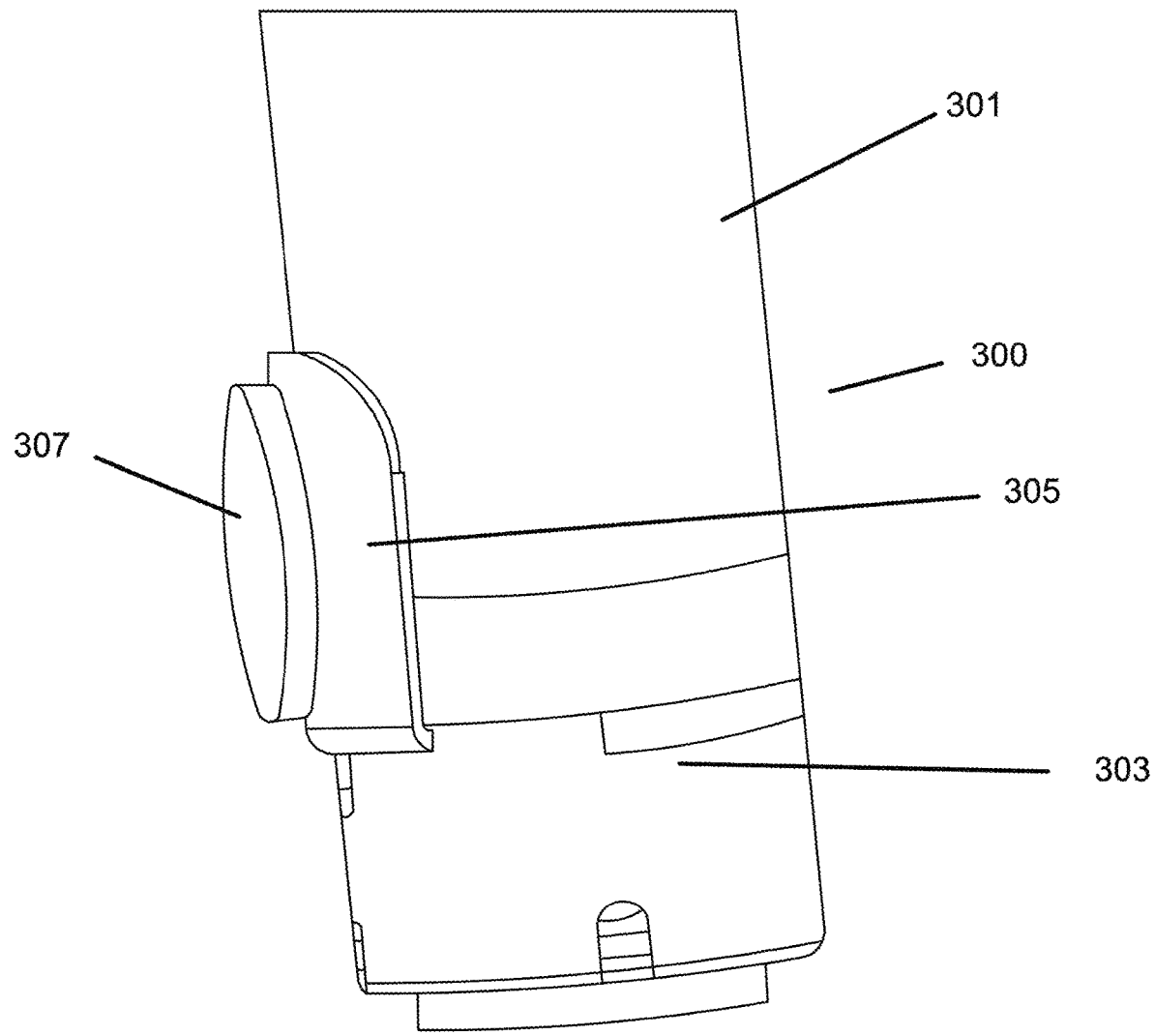
FIG. 3 is an embodiment of the present invention attached to the commercially-available wireless hair clipper.

FIG. 3 is an embodiment 300 of the adapter 303 attached to H) the commercially-available wireless hair clipper 301. The adapter 303 generally attaches to the posterior of the hair clipper 301 body. Generally, the adapter 303 will position itself at the point where the wireless hair clipper previously attached to an AC power source. The adapter 303 connects with 20 the hair clipper 301 at the conduits, and at a second point, in this embodiment via a side panel 305 shaped to mimic the contour of the body of the hair clipper 301. In other embodiments, the side panel 305 may be flat, slightly contoured, or extremely contoured depending on the shape of the hair clipper body. The adapter 303 has stored thereon a housing 307 wherein a receiver unit (not shown) is stored. In use, the receiving unit is a receiving coil within the housing 307 for the generation of a current from a radiating transmitter. While being inside the housing 307, the housing 307 contacts with the wirelessly charging means, or platform. The housing 307 can be shaped as a circular disc, such as this embodiment, or it can be shaped as another shape depending on the needs of the wireless clipper in terms of recharging capabilities. It within the ordinary skill of one in the art to shape the housing 307 to generate the highest most efficient current for recharging the rechargeable battery power source of the wireless hair clipper 301.

Figure 4:
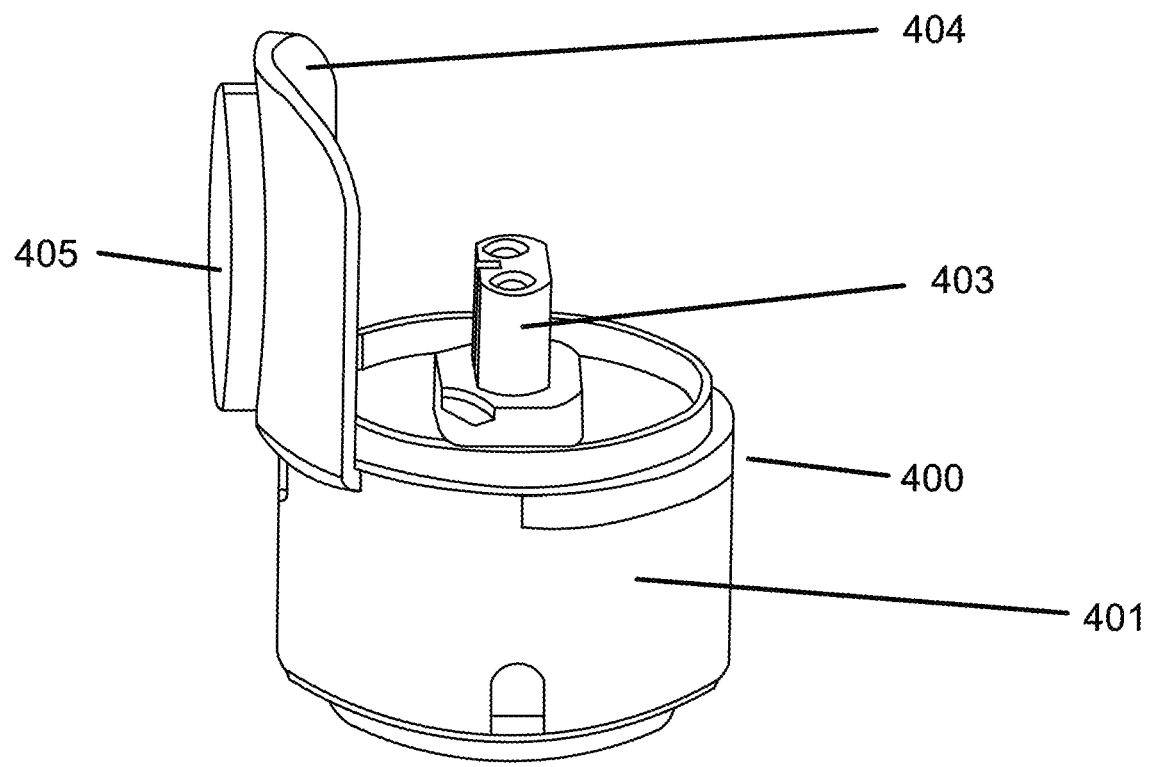
FIG. 4 is an embodiment of the present invention.

FIG. 4 is an embodiment of the adapter 400 of the present invention, whereby the adapter 400 is capable of turning any commercially-available wireless hair clipper into a wireless hair clipper capable of being recharged wirelessly. The adapter 400 is generally secured post-purchase of the commercially-available wireless clipper, whereby the wireless clipper is capable of being charged by AC power source. In some embodiments, the wireless clipper may be purchased after the adapter 400 is obtained. Nonetheless, the wireless clipper should be considered 'commercially-available'. The adapter 400 has a base part 401, wherein electricity converting means are housed, a power delivery means 403 having conduits delivering the electrical charge to the batteries stored in the wireless clipper (not shown), a guard 404 that meets the contour of the wireless clipper while protecting the body of the clippers from induction wiring, and a housing 405 for the induction wiring whereby the housing 405 can be of a suitable shape to meet the power needs of the wireless clipper.

The adapter 400 is presented as a single unit capable of being secured at or around the posterior of the wireless clipper so that the adapter 400 does not interfere in the professionals use or handling of the wireless hair clipper. In one embodiment, the guard 404 raises approximately from 1 to 3 inches along side the hair clipper body as measured from the base of the clipper sans the adapter.

Figure 5:
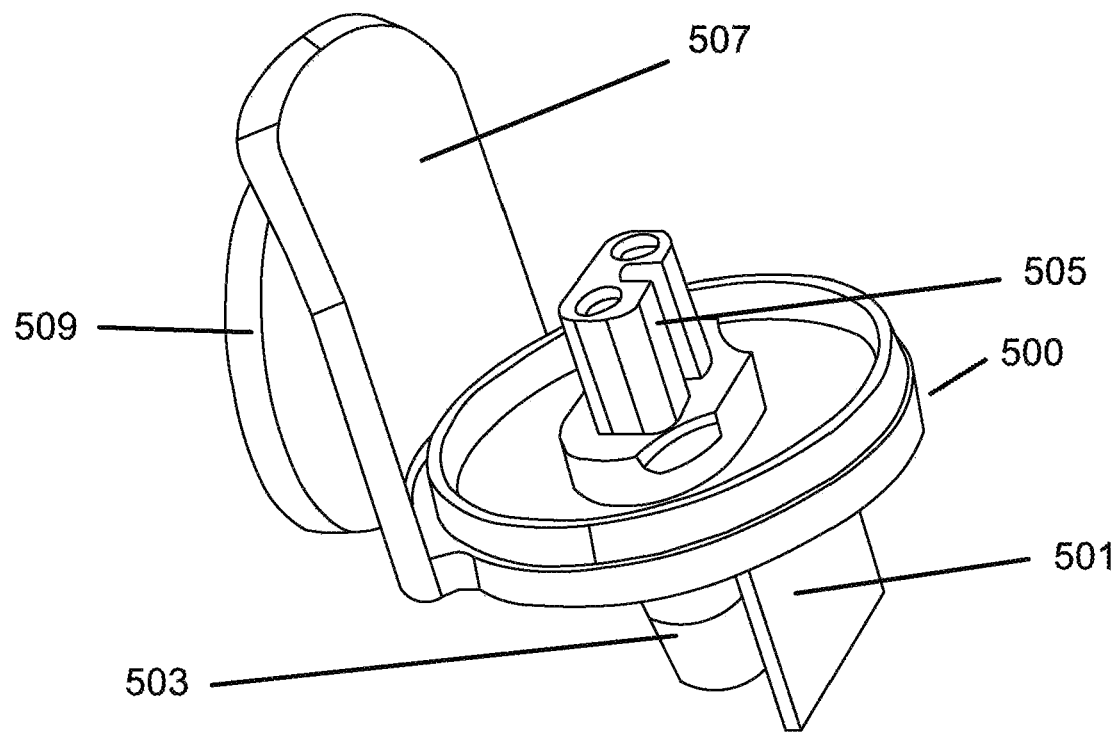
FIG. 5 is an embodiment of the present invention.

FIG. 5 is an embodiment of the adapter 500 of the present invention, whereby the base of the adapter 500 has been removed to exhibit the electrical delivering units 503 and shield 501. The electrical delivery units 503 conduct electrical charge from the induction coils stored in the housing 509, and deliver the charge to the conduits 505 which in turn deliver the charge to the rechargeable batteries stored in the body of the wireless clipper.

Figure 6:
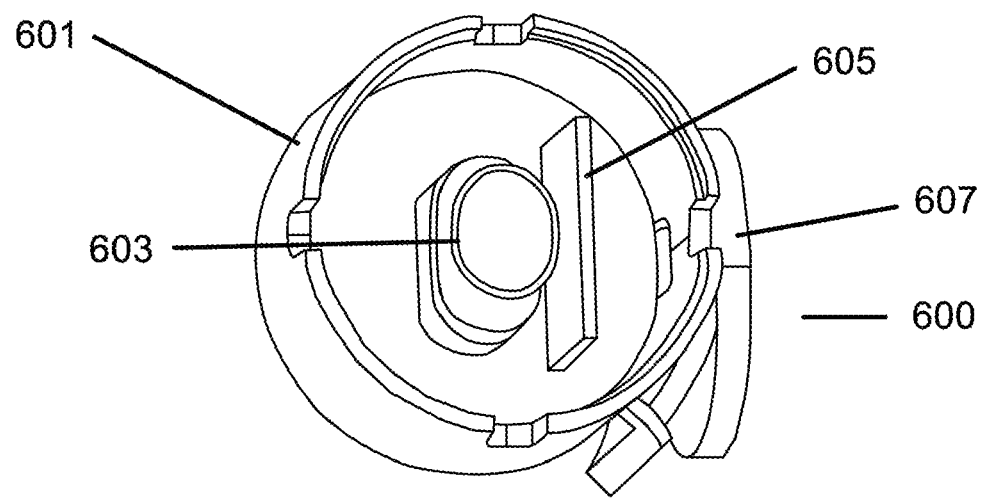
FIG. 6 is an embodiment of the present invention, visualized from the bottom side.

FIG. 6 is an embodiment of the adapter 600 of the present invention, visualized from the bottom side. As shown, the housing 601 exhibits the electrical delivery units 603 and a shield 605 which protects the delivery units 603 from the coils stored in the housing 607.

Figure 7:
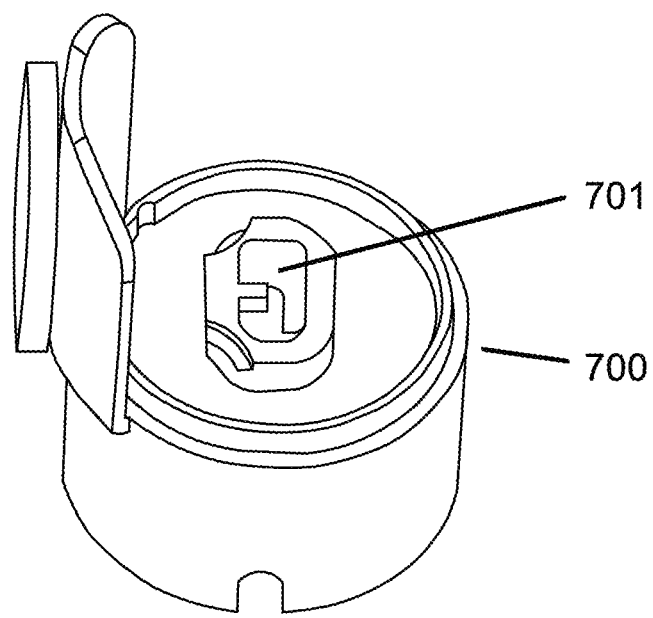
FIG. 7 is an embodiment of the present invention, wherein the top part is in bird's eye view.

FIG. 7 is an embodiment of the adapter 700 of the present 15 invention, wherein the top part is in bird's eye view. As shown, the top part holds a conduit housing 701 which accepts conduits for delivering electrical charge to the rechargeable batteries of the wireless clipper.

Figure 8:
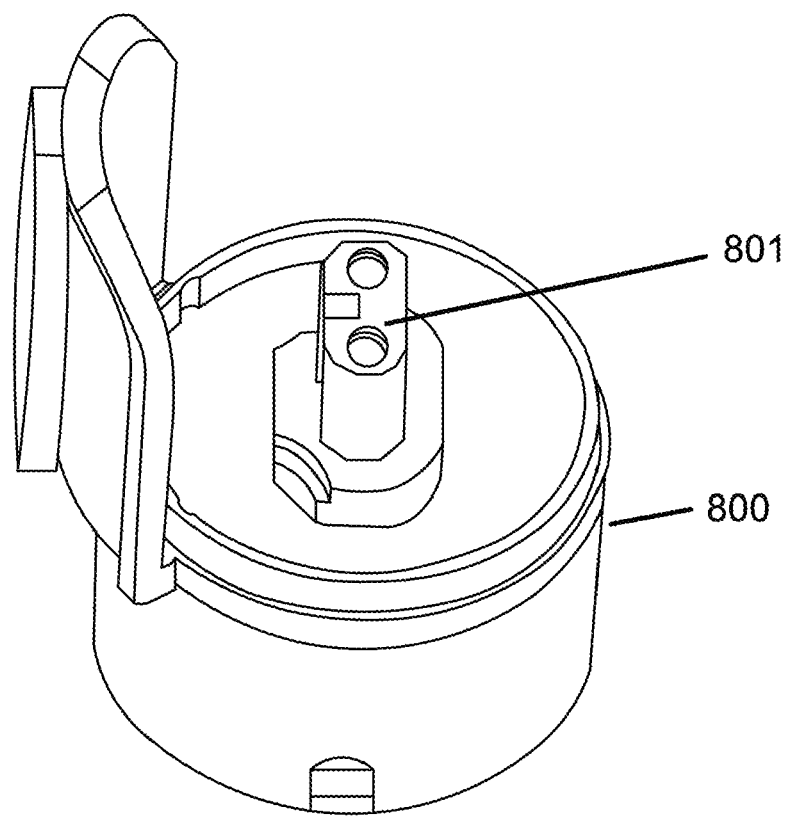
FIG. 8 is an embodiment of the present invention.

FIG. 8 is an embodiment of the adapter 800 wherein the conduit 801 of the adapter 800 are positioned in place. The conduit 801 design in this embodiment has two conduits. In an alternative embodiment, the conduit design can be one conduit for attachment to the recharging mechanism of the wireless clipper. In another embodiment, there can be three conduits for attachment to the rechargeable batteries of the wireless clipper. In a still further embodiment, the conduit 801 is removable, allowing a different conduit design to be inserted therein. In a preferred embodiment, the conduit design is such that it matches at least two wireless hair clippers produced by two different manufacturers or brands. In a preferred embodiment, the conduit should be designed to match as many different products or different brands, makes, and models of wireless clippers as possible. Thus, the specific type of brand, make or model of wireless clipper is irrelevant to the use or application of the adapter thereon.

Figure 9:
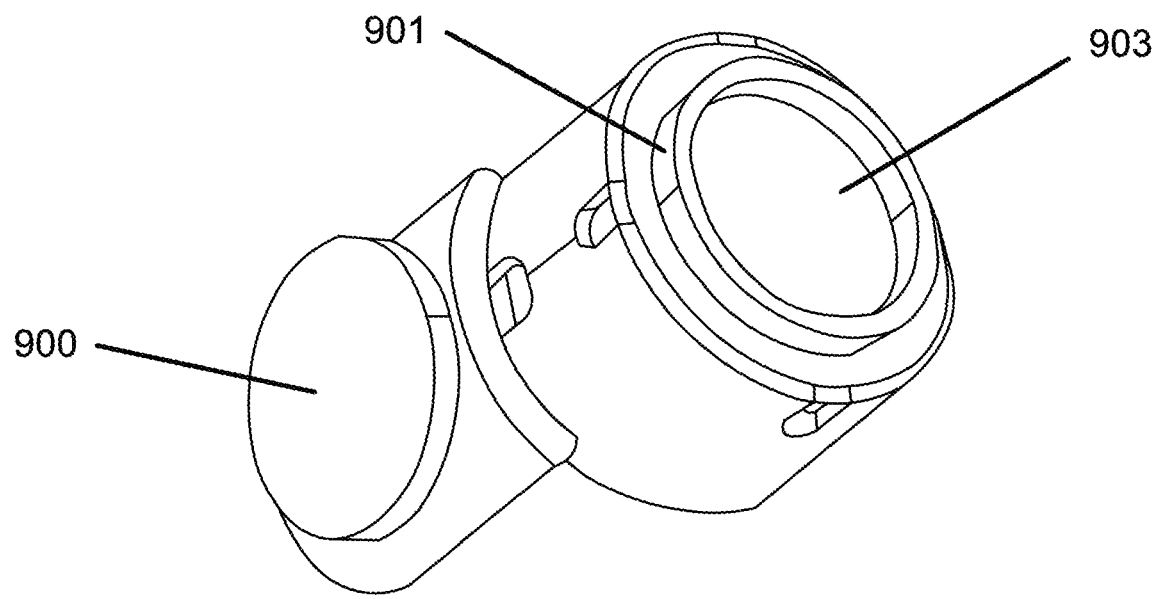
FIG. 9 is an embodiment of the present invention.

FIG. 9 is an embodiment of the adapter 900 of the invention, wherein the bottom side of the adapter 900 is shown, having an external cover in place 905, and including a railing 901 having a diameter smaller than the overall diameter of the adapter 900. A base 903 is positioned underneath the railing 901, providing protection for the electrical components stored within the adapter 900.

Figure 10:
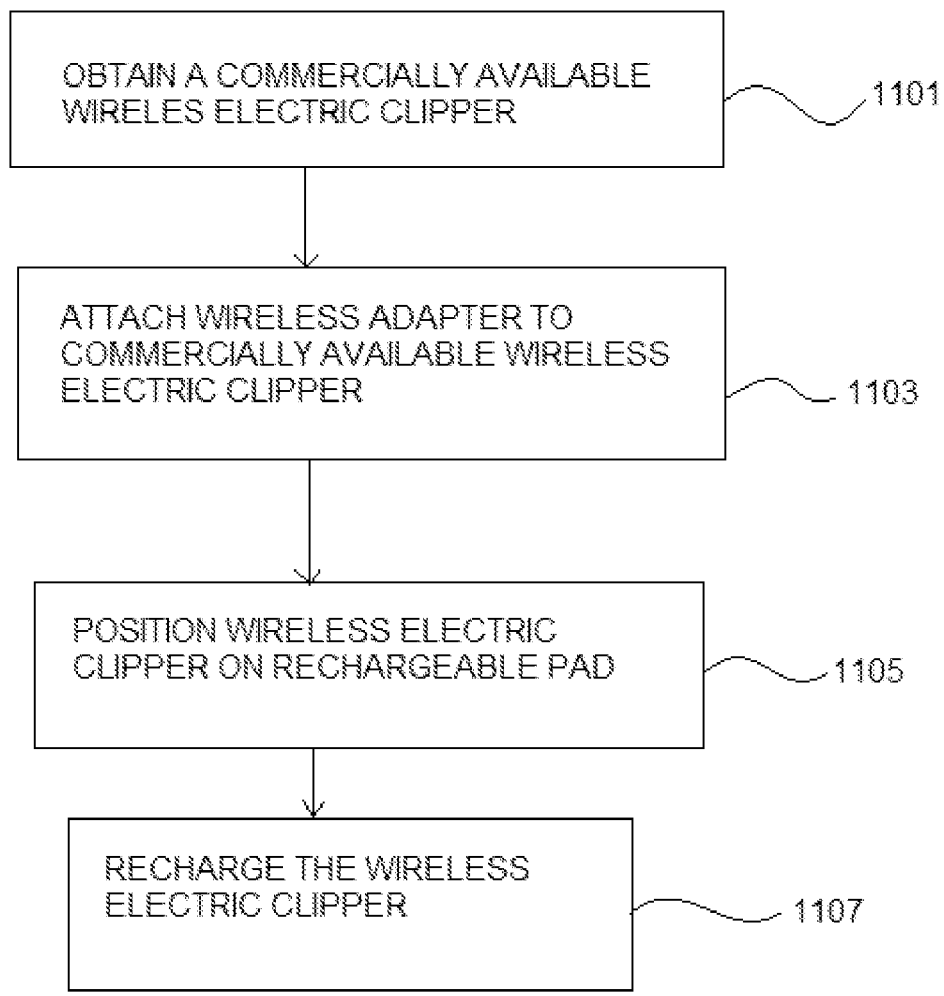
FIG. 10 is an embodiment of the method of recharging a wireless clipper.

FIG. 10 is an embodiment of the method of recharging a wireless clipper having rechargeable power source wirelessly, wherein the wireless clipper is a commercially-available product that was not originally, as manufactured, to be capable of wireless recharging.

FIG. 10 shows the steps including obtaining the wireless clipper 1101, attaching the adapter to the clipper 1103, positioning the converted wireless clipper on a charging pad 1105, and wirelessly charging the rechargeable power source of the wireless clipper.

Commercially-available wireless clippers 1101 can be obtained prior to obtaining the adapter, such as by purchasing clippers from at least two different manufacturers, wherein the clippers can be of different brands, makes, and models. In one embodiment, the wireless clipper can be obtained from 1 to 5 years prior to the attachment of the adapter. In another embodiment, the wireless clipper can be obtained in the future. It is well known in the art that hair care professionals regularly obtain 3 to 5 different clippers to perform hair grooming for clients. Often, these clippers are from different sources.

The adapter of the present invention is attached to the wireless clippers 1103, notably at the point where the wireless clipper is normally attached to the AC power source. Attachment of the adapter in one embodiment, is at the posterior of the clippers. The adapter may be removably attached, however, in practice, users of the adapter will likely permanently attached the adapter to the wireless clipper in order to continue to obtain wireless charging.

The converted wireless clipper is then positioned on the rechargeable pad 1105. In practice, the hair care professional will lay the converted clipper on the pad whenever the clipper is not in use. This allows the converted clipper to remain in recharged 1107 state throughout the work day of the professional.

I claim:

1. An adapter for enabling wireless charging of a commercially available wireless hair clippers, wherein said commercially available wireless hair clippers was previously unable to be recharged wirelessly, comprising
    a base part, wherein electricity converting means are housed;
    a power delivery means having conduits delivering an electrical charge to batteries stored in said wireless electric hair clippers;
    a guard protecting the body of said wireless electric hair clippers; and
    a housing holding induction wiring, wherein said induction wiring serves as a receiver for induced current for a recharging pad transmitter.

2. The adapter of claim 1, whereby said adapter connects said wireless electric hair clippers at said conduits, and at a side panel of said wireless electric hair clippers.

3. The adapter of claim 1, whereby said guard is flat.

4. The adapter of claim 1, whereby said housing is in the shape of a circular disc.

5. The adapter of claim 1, whereby said guard raises from 1 to 3 inches alongside said wireless electric hair clipper body.

6. The adapter of claim 1, whereby the adapter has one to three conduits.

7. The adapter of claim 1, whereby the conduits are removable.

8. The adapter of claim 1, whereby the conduit design matches at least two wireless hair clippers produced by different manufacturers or brands or models.

9. The adapter of claim 1, whereby the adapter having an external cover at said base part, said external cover including a railing having a diameter smaller than the overall diameter of said adapter and a base positioned underneath the railing providing protection for said electrical components stored within said adapter.

10. A commercially available wireless electric hair clippers capable of being recharged wirelessly, comprising,
   a wireless electric hair clipper, whereby said wireless electric hair clipper is obtained from the marketplace,
   an adapter attached to said wireless electric hair clipper, said adapter including a base part for housing electricity converting means, a power delivery means having conduits delivering an electrical charge to batteries stored in said wireless electric hair clippers, a guard, and
a housing for the induction wiring, wherein said adapter is attached to said wireless electric hair clippers following obtaining said wireless electric hair clipper from the marketplace.

11. The wireless charging electric hair clipper set of claim 10, whereby said adapter is removably attached.

12. The wireless charging electric hair clipper set of claim 10, whereby the adapter is permanently attached to said wireless electric hair clipper.

13. The wireless charging electric hair clipper set of claim 10, whereby the conduit design matches at least two wireless hair clippers produced by different manufacturers.

14. The wireless charging electric hair clipper set of claim 10, whereby said guard raises from 1 to 3 inches alongside the wireless electric hair clipper body.

15. The wireless charging electric hair clipper set of claim 10, whereby said adapter having an external cover at said base part, said external cover including a railing having a diameter smaller than the overall diameter of the adapter and a base positioned underneath said railing providing protection for said electrical components stored within said adapter.

16. The wireless charging electric hair clipper set of claim 10, whereby the housing is in the shape of a circular disc.

17. A method of recharging a commercially available wireless electric hair clipper wirelessly comprising,
   obtaining said commercially available wireless electric hair clipper;
   attaching an adapter to said commercially available wireless electric hair clipper, whereby said wireless adapter includes a base part, wherein electricity converting means are housed; a power delivery means having conduits delivering an electrical charge to batteries stored in said wireless electric hair clippers; a guard protecting the body of said wireless electric hair clippers; and a housing holding induction wiring, wherein said induction wiring serves as a receiver for induced current for a recharging pad transmitter;
   positioning said commercially available wireless electric hair clipper on a recharging pad; and
   recharging said commercially available wireless electric hair clipper.

18. The method of recharging a commercially available wireless electric hair clipper wirelessly of claim 17, further comprising charging two or more commercially available wireless electric hair clipper using the same said adapter, wherein said two or more commercially available wireless electric hair clippers are obtained from different manufacturers.

19. The method of recharging a commercially available wireless electric hair clipper wirelessly of claim 17, wherein said commercially available wireless electric hair clipper is obtained from the marketplace.

20. The method of recharging a commercially available wireless electric hair clipper wirelessly of claim 17, wherein positioning said commercially available wireless electric hair clipper on a recharging pad includes laying said adapter on top of said recharging pad.

* * * * *